United States Patent
Debril (10) Patent No.: US 12,234,025 B2
(45) Date of Patent: Feb. 25, 2025

(54) CRYOGENIC FLUID PRESSURE VESSEL AND AIRCRAFT

(71) Applicant: Airbus Operations GmbH, Hamburg (DE)

(72) Inventor: Gilles Debril, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 280 days.

(21) Appl. No.: 17/724,557

(22) Filed: Apr. 20, 2022

(65) Prior Publication Data

US 2022/0340296 A1 Oct. 27, 2022

(30) Foreign Application Priority Data

Apr. 23, 2021 (DE) .......................... 102021110452.1

(51) Int. Cl.
| | | |
|---|---|---|
| *B64D 37/30* | (2006.01) | |
| *B64D 37/04* | (2006.01) | |
| *F17C 1/12* | (2006.01) | |

(52) U.S. Cl.
CPC ............. *B64D 37/30* (2013.01); *B64D 37/04* (2013.01); *F17C 1/12* (2013.01);
(Continued)

(58) Field of Classification Search
CPC . B64D 37/04; B64D 37/30; F17C 1/12; F17C 2201/0128; F17C 2201/0104; F17C 2221/012; F17C 2270/0189
See application file for complete search history.

(56) References Cited

U.S. PATENT DOCUMENTS

| 3,392,865 A | 7/1968 | Dryden | |
|---|---|---|---|
| 3,951,362 A * | 4/1976 | Robinson | ............... B64D 37/06 |
| | | | 220/560.07 |

(Continued)

FOREIGN PATENT DOCUMENTS

| DE | 60315481 T2 | 4/2008 |
|---|---|---|
| DE | 112004000261 B4 | 12/2013 |

(Continued)

OTHER PUBLICATIONS

German Search Report; priority document.

*Primary Examiner* — Ana M Vazquez
(74) *Attorney, Agent, or Firm* — Greer, Burns & Crain, Ltd.

(57) ABSTRACT

A cryogenic fluid pressure vessel for an aircraft, having: a first wall layer, which contains carbon fiber-reinforced plastic, having an inner contact surface for the contact with a pressurized cryogenic fluid to be accommodated inside the cryogenic fluid pressure vessel; a second wall layer, which is arranged on an outer surface of the first wall layer and has a thermal barrier; a closable inlet/outlet opening for cryogenic fluid, which extends through the first and the second wall layer; and a structural insert integrated in the first and the second wall layer, which has a fastening connecting piece located on the outside of the cryogenic fluid pressure vessel for mechanically coupling the cryogenic fluid pressure vessel with external structures; wherein the cryogenic fluid pressure vessel forms an essentially cylindrical main body. Furthermore, the present invention provides an aircraft having such a cryogenic fluid pressure vessel.

18 Claims, 3 Drawing Sheets

(52) U.S. Cl.
CPC ............ *F17C 2201/0104* (2013.01); *F17C 2201/0128* (2013.01); *F17C 2203/0329* (2013.01); *F17C 2203/0391* (2013.01); *F17C 2203/0629* (2013.01); *F17C 2203/0673* (2013.01); *F17C 2221/012* (2013.01); *F17C 2223/0161* (2013.01); *F17C 2223/036* (2013.01); *F17C 2227/0341* (2013.01); *F17C 2270/0189* (2013.01)

(56) References Cited

U.S. PATENT DOCUMENTS

| | | | | |
|---|---|---|---|---|
| H80 H | * | 7/1986 | Lewis | B65D 35/22 222/95 |
| 5,476,189 A | * | 12/1995 | Duvall | F17C 1/16 220/62.19 |
| 6,708,502 B1 | | 3/2004 | Aceves et al. | |
| 6,951,162 B1 | * | 10/2005 | Shockey | B64C 1/066 89/36.02 |
| 7,743,940 B2 | | 6/2010 | Brunnhofer | |
| 9,783,324 B2 | * | 10/2017 | Embler | B32B 5/02 |
| 9,873,323 B2 | | 1/2018 | Stahl | |
| 11,125,387 B2 | * | 9/2021 | Katano | B29C 70/086 |
| 2010/0116420 A1 | | 5/2010 | Matsuoka et al. | |
| 2014/0263358 A1 | * | 9/2014 | Espinosa-Loza | F17C 13/06 220/560.04 |
| 2018/0259125 A1 | | 9/2018 | Cousigne et al. | |

FOREIGN PATENT DOCUMENTS

| | | |
|---|---|---|
| DE | 102015206826 A1 | 9/2016 |
| DE | 102015220530 A1 | 4/2017 |
| DE | 102015222392 A1 | 5/2017 |

* cited by examiner

CRYOGENIC FLUID PRESSURE VESSEL AND AIRCRAFT

CROSS-REFERENCES TO RELATED APPLICATIONS

This application claims the benefit of the German patent application No. 102021110452.1 filed on Apr. 23, 2021, the entire disclosures of which are incorporated herein by way of reference.

FIELD OF THE INVENTION

The present invention relates to a cryogenic fluid pressure vessel and an aircraft having such a cryogenic fluid pressure vessel.

BACKGROUND OF THE INVENTION

Conventional airplanes use jet fuel as the energy source for their drive. Alternative types of drive can be operated, for example, using liquid hydrogen, wherein this fluid demands different storage requirements in comparison to jet fuel, however.

The conventional fuselage-wing arrangement causes large bending torques in the wing roots, since the greatest load is in the middle at the fuselage, and the lift is located further outwards at the wings, however. The reason for distributing the mass of the airplane as uniformly as possible over the wingspan is established in this point. The jet fuel is accordingly predominantly stored in the wings in conventional airplanes and conveyed from there to the turbines. In contrast, storing hydrogen requires a large-volume tank, which withstands high pressure at low temperatures at the same time and has an increased shock resistance to protect from damage. Furthermore, the large-area distribution of the fuel over the wings makes adequate cooling of the fuel more difficult, as is necessary with hydrogen. Existing airplane tanks thus cannot readily meet the demands for hydrogen tanks for airplanes.

SUMMARY OF THE INVENTION

It is an object of the present invention to provide an improved mechanical integration option of high-pressure tanks for cryogenics, which are compatible with the load-bearing capacity of the airplane architecture.

According to a first aspect of the invention, a cryogenic fluid pressure vessel for an aircraft is provided. The cryogenic fluid pressure vessel comprises a first wall layer, which contains carbon fiber-reinforced plastic, having an inner contact surface for the contact with a pressurized cryogenic fluid to be accommodated inside the cryogenic fluid pressure vessel. Furthermore, the cryogenic fluid pressure vessel comprises a second wall layer, which is arranged on an outer surface of the first wall layer and has a thermal barrier, and a closable inlet/outlet opening for cryogenic fluid, which extends through the first and the second wall layer. In addition, the cryogenic fluid pressure vessel contains a structural insert integrated in the first and the second wall layer, which has a fastening connecting piece located on the outside of the cryogenic fluid pressure vessel for mechanically coupling the cryogenic fluid pressure vessel with external structures. The cryogenic fluid pressure vessel forms an essentially cylindrical main body.

According to a second aspect of the invention, an aircraft, in particular an airplane, is provided. The aircraft comprises a cryogenic fluid pressure vessel according to the invention and an outer shell, which encloses sections of the cryogenic fluid pressure vessel, wherein the outer shell and the fastening connecting piece of the structural insert of the cryogenic fluid pressure vessel are coupled by a fastening means.

An underlying concept of the present invention is to provide a cryogenic fluid pressure vessel which can be used as a cryogenic tank in aircraft to store cryogenic fluids, which are required for a low-emission drive of the aircraft, for example a hydrogen drive. The cryogenic fluid pressure vessel contains at least two wall layers, which each fulfill specific functions. The first wall layer, for example, has endless carbon fibers in the carbon fiber-reinforced plastic, which are produced by means of a so-called winding technology, wherein the carbon fibers are impregnated by machine in a resin bath and deposited by CNC-controlled machines on a rotating tool mandrel. In comparison to carbon fiber-reinforced components made of fabrics, components wound by means of the winding technology can have a 20% lower weight of the same component with identical mechanical properties. In addition, it is possible by way of the winding technology to produce the first wall layer in one piece, as a result of which the bending stiffness of the pressure vessel is increased. The inner contact surface of the first wall layer can optionally be lined with light metal, in particular with aluminum.

The second wall layer causes, by way of the thermal barrier, in particular a temperature control of the cryogenic fluid, since it generally has temperatures of less than 100 K. Since carbon fiber-reinforced plastic also has thermal insulation properties, the thermal barrier can also extend over the first and the second wall layer or the second wall layer can additionally have carbon fiber-reinforced plastic.

The cryogenic fluid pressure vessel can furthermore have, for example, a third wall layer, which is arranged on the first, the second, or between the first and the second wall layer. The third wall layer can have, for example, mechanical reinforcements, in particular reinforcements made of aluminum, and/or textile inlays, in particular inlays having aramids to increase the energy absorption capacity. The cryogenic fluid pressure vessel can thus be made more resistant to forces occurring on the outside or inside and/or to damage. Alternatively or additionally, the third wall layer can have materials to protect from chemical stresses.

The essentially cylindrical main body is designed, for example, as a cylinder, as a truncated crown, as a truncated pyramid, as a prism, or combinations thereof, wherein the end faces are each, in particular, shaped hemispherical or convexly curved in a hemisphere. In this case, the lateral surface denotes the region of the surface which is arranged between the two end faces. I.e., the lateral surface is preferably rotationally symmetrical and extends in the longitudinal direction of the cryogenic fluid pressure vessel.

According to one embodiment of the cryogenic fluid pressure vessel, the thermal barrier has a cooling device, which is designed as a pipeline system for conveying refrigerants, so that a refrigerant flowing through the pipeline system causes convective cooling of a cryogenic fluid accommodated in the cryogenic fluid pressure vessel. Active cooling of the cryogenic fluid is thus possible.

According to a further embodiment of the cryogenic fluid pressure vessel, the thermal barrier has an insulation device, which is designed as a sandwich structure having a vacuum in a fluidically sealed sandwich core, having a foam core, or having an inert gas filling in the fluidically sealed sandwich core for thermal insulation between a cryogenic fluid accommodated inside the cryogenic fluid pressure vessel and the surroundings. In this way, the temperature conductivity of the thermal barrier or the second wall layer can be reduced.

According to a further embodiment of the cryogenic fluid pressure vessel, the fastening connecting piece is arranged on the lateral surface of the essentially cylindrical cryogenic fluid pressure vessel. The cryogenic fluid pressure vessel can thus be coupled with further wall structures and/or fasteners for support.

According to a further embodiment of the cryogenic fluid pressure vessel, the structural insert is integrated in a form-fitting manner in the first wall layer by overlaps of the carbon fiber-reinforced plastic. In this way, the forces and/or torques which can act on the structural insert are absorbed in all attack directions by the first wall layer.

According to a refinement of the cryogenic fluid pressure vessel, the first wall layer has a thicker wall layer thickness in the region in which it overlaps the structural insert than in regions not provided with the structural insert. The mechanical load-bearing capacity of the first wall layer can thus be increased in the region of the structural inserts.

According to a further embodiment of the cryogenic fluid pressure vessel, a pressure of 350 to 750 bar can be applied to a cryogenic fluid accommodated inside the cryogenic fluid pressure vessel.

According to a further embodiment of the cryogenic fluid pressure vessel, the lateral surface of the cryogenic fluid pressure vessel is formed elliptical in cross section. Alternatively or additionally, the lateral surface of the cryogenic fluid pressure vessel is formed conical in longitudinal section. In this way, a particularly suitable shape for pressure vessels is provided structurally and the existing installation space is optimally used or the center of gravity of the cryogenic fluid pressure vessel is shifted in consideration of the existing installation space.

According to a further embodiment of the cryogenic fluid pressure vessel, the fastening connecting piece of the structural insert has an internal thread, an eye, a bayonet fitting, or a material which can be welded or adhesively bonded on the outside. Conventional, in particular standardized fastening means may thus be coupled to the structural insert and thus to the cryogenic fluid pressure vessel.

According to one embodiment of the aircraft, the cryogenic fluid pressure vessel is positioned in a central region of the aircraft with respect to a transverse axis of the aircraft. The center of gravity of the aircraft can thus be regulated more easily even upon changing fill level of the pressure vessel.

According to a further embodiment of the aircraft, material inlays having aramids are arranged in sections on the outer shell to increase the energy absorption capacity. The material inlays having aramids are arranged in sections, in particular, in the central region of the aircraft with respect to a transverse axis of the aircraft. In this way, inner regions of the aircraft and, in particular, the cryogenic fluid pressure vessel are better protected in case of bullets, bodies, or the like impacting the outer shell, since aramids, in particular para-aramid fibers, have a high energy absorption capacity and are typically used, inter alia, in armor for vehicles.

According to a further embodiment, the aircraft furthermore has a first and a second payload fuselage section for accommodating freight and/or persons, which are enclosed by the outer shell, wherein the cryogenic fluid pressure vessel is positioned between the first and the second payload fuselage section at least in regions with respect to a transverse axis of the aircraft. The weight of the aircraft including the payload to be expected can thus be distributed symmetrically with respect to the cryogenic fluid pressure vessel. In particular in aircraft, the exact center of gravity position plays an important role and in addition is to remain controllable during flight.

According to one refinement of the aircraft, the first and the second payload fuselage section each extend longitudinally and are aligned at an angle in relation to one another in their longitudinal extension, the intersection point of which corresponds to the nose of the aircraft. The angle is provided, in particular, in such a way that the two payload fuselage sections are aligned in a V shape, i.e., in an angle range of 10° to 85° to one another, in particular in an angle range of 25° to 70° to one another. In this way, an aerodynamic, symmetrical, and compact design of the aircraft is enabled.

According to a further embodiment of the aircraft, the outside of the cryogenic fluid pressure vessel, viewed in the vertical axis of the aircraft, corresponds on two opposing sections of the lateral surface of the cryogenic fluid pressure vessel to the contour of the outer shell, so that the two opposing sections each have a double-walled structure. The bending and/or torsional stiffness of the aircraft can thus be increased in that the outer shell and the outside of the cryogenic fluid pressure vessel mutually support one another.

The above embodiments and refinements may be combined with one another as desired, if reasonable. Further possible embodiments, refinements, and implementations of the invention also comprise combinations, which are not explicitly mentioned, of features of the invention described above or hereinafter with respect to the exemplary embodiments. In particular, a person skilled in the art will also add individual aspects as improvements or additions to the respective basic form of the present invention.

BRIEF DESCRIPTION OF THE DRAWINGS

The present invention is explained in more detail hereinafter on the basis of exemplary embodiments with reference to the appended figures of the drawings. In the figures.

In the figures of the drawing, identical, functionally identical, and identically acting elements, features, and components—if not indicated otherwise—are each provided with the same reference sign.

Although in the present case specific embodiments and refinements are illustrated and described, a person skilled in the art will prefer that a plurality of alternative and/or equivalent embodiments can replace the illustrated and described specific exemplary embodiments without deviating from the scope of the present invention. This application is in general to cover all modifications or changes of the specific exemplary embodiments described herein.

The appended figures are to provide further understanding of embodiments of the invention and are used in conjunction with the description to explain principles and concepts of the invention. Other exemplary embodiments and many of the mentioned advantages result with regard to the drawings. The drawings are to be understood solely as schematic drawings and elements of the drawings are not necessarily shown to scale in relation to one another. Direction-specifying terminology such as "upper", "lower", "left", "right", "above", "below", "horizontal", "vertical", "front", "rear", and similar specifications are used solely for explanatory purposes and do not serve to restrict the generality to specific embodiments as shown in the figures.

A payload fuselage section in the meaning of the present application comprises any volume in the interior of an aircraft enclosed by a fuselage shell, which can be used to accommodate and transport payload of the aircraft. Payload of an aircraft can be, on the one hand, air passengers or passengers, on the other hand, cargo or freight. Aircraft to be used commercially have such a payload region in the interior of the aircraft.

DETAILED DESCRIPTION OF THE PREFERRED EMBODIMENTS

Figure 1:
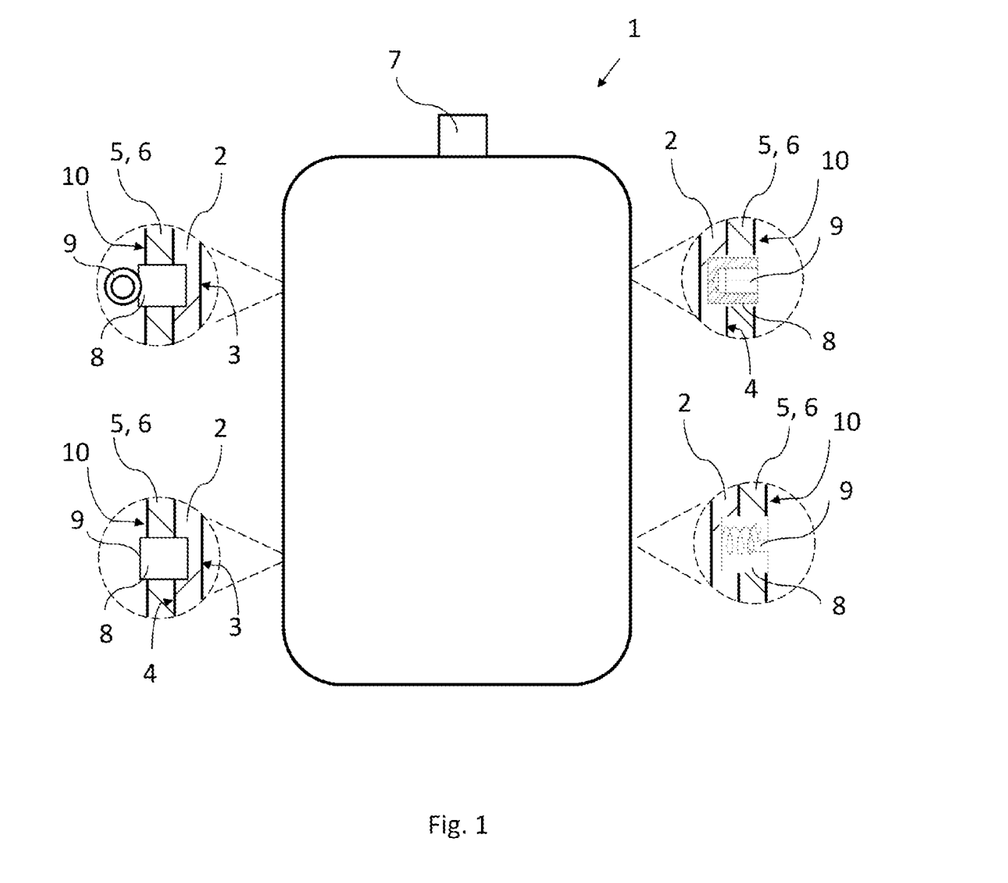
FIG. 1 shows a schematic side view of a cryogenic fluid pressure vessel having four exemplary structural inserts, which are each shown in a breakout view, according to one exemplary embodiment of the invention.

FIG. 1 shows a schematic side view of a cryogenic fluid pressure vessel 1 having four exemplary structural inserts 8, which are each shown in a breakout view, according to an exemplary embodiment of the invention.

The cryogenic fluid pressure vessel 1 comprises a first wall layer 2, which contains, for example, carbon fiber-reinforced plastic. The first wall layer 2 can optionally also contain glass fiber-reinforced plastic, light metals, ceramics, or alloys. The first wall layer has an inner contact surface 3 for the contact with a pressurized cryogenic fluid to be accommodated inside the cryogenic fluid pressure vessel 1. During the production of the first wall layer 2, the so-called winding technology was applied, in which endless carbon fibers are impregnated by machine in a resin bath and deposited by CNC-controlled machines on a rotating tool mandrel. Other production methods are conceivable for the first wall layer 2 depending on the material used. For example, a steel square end block heated to forging temperature can be preformed in an upsetting press and then receive the shape of a hollow cylinder open on one side in a piercing press by backward extrusion. Subsequently, rollers press the hollow cylinder open on one side from the outside and initially also from the inside for tapering in order to create the bottleneck.

Furthermore, the cryogenic fluid pressure vessel 1 comprises a second wall layer 5, which is arranged on an outer surface 4 of the first wall layer 2. The second wall layer 5 moreover has a thermal barrier 6. The thermal barrier 6 decreases an equalization of the temperature of the cryogenic fluid inside the cryogenic fluid pressure vessel 1 to the ambient temperature. For this purpose, the thermal barrier 6 has a temperature conductivity, for example, of less than 0.01 W/mK. Alternatively or additionally, the thermal barrier 6 can actively withdraw thermal energy from the cryogenic fluid.

In the exemplary embodiment according to FIG. 1, the cryogenic fluid pressure vessel 1 also has a closable inlet/outlet opening 7 for cryogenic fluid. The inlet/outlet opening 7 extends through the first and the second wall layer. It is used to be able to fill the cryogenic fluid pressure vessel 1 or remove fluid contained therein and can be provided with a closable valve. The inlet/outlet opening 7 can be designed, for example, like a standard fitting for hydrogen.

In addition, the cryogenic fluid pressure vessel 1 contains a structural insert 8 integrated in the first and the second wall layer 2, 5. The structural insert 8 is, in particular, permanently connected to the first wall layer 2. This structural insert 8 has a fastening connecting piece 9 located on the outside 10 of the cryogenic fluid pressure vessel 1 for mechanically coupling the cryogenic fluid pressure vessel 1 to external structures. The fastening connecting piece 9 of the structural insert 8 optionally has an internal thread, an eye, a bayonet fitting, or a material which can be welded or adhesively bonded on the outside 10. This means that the fastening connecting piece 9 is either arranged flush with the outside 10 on the same level or protrudes outward beyond the outside 10. Accordingly, the fastening connecting piece 9 can be accessed or coupled from the outside with complementary fastening means and/or external structures.

Furthermore, the cryogenic fluid pressure vessel 1 forms an essentially cylindrical main body. The main body of the cryogenic fluid pressure vessel 1 is formed cylindrical, by way of example, in FIG. 1. The closable inlet/outlet opening 7 is arranged, by way of example, on one of the end faces.

Furthermore, the fastening connecting piece 9 is arranged, for example, on the lateral surface of the essentially cylindrical cryogenic fluid pressure vessel 1. Additionally or alternatively, the arrangement of the fastening connecting piece 9 or the structural insert 8 on the end face of the essentially cylindrical cryogenic fluid pressure vessel 1 is also conceivable, for example on the same end face as the closable inlet/outlet opening 7, on the opposing end face, or on both end faces.

Figure 2:
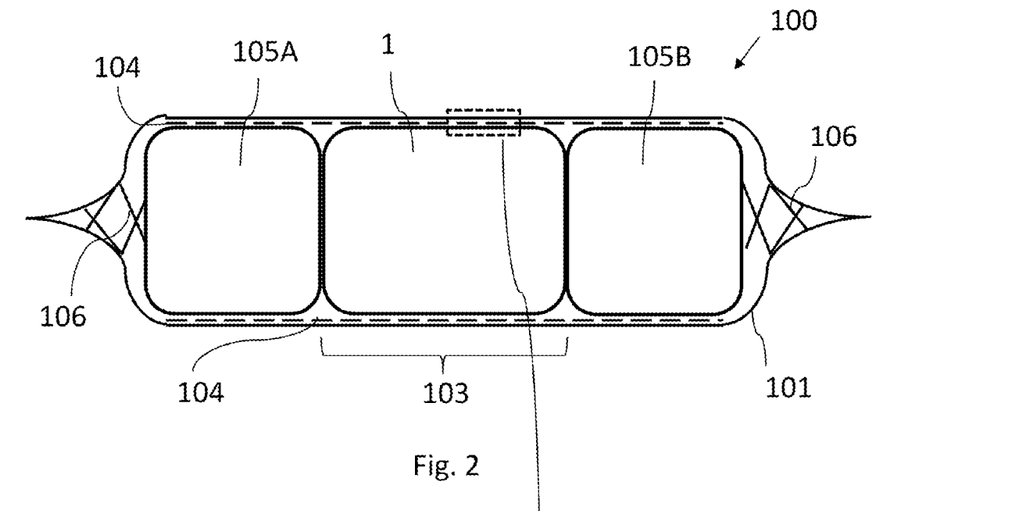
FIG. 2 shows a schematic rear view in section of an aircraft having a cryogenic fluid pressure vessel, which is positioned between a first and a second payload fuselage section, according to a further exemplary embodiment of the invention.

FIG. 2 shows a schematic rear view in section of an aircraft 100 having a cryogenic fluid pressure vessel 1, which is positioned between a first and a second payload fuselage section 105A, 105B, according to a further exemplary embodiment of the invention. The aircraft 100 comprises a cryogenic fluid pressure vessel 1, which essentially corresponds to the cryogenic fluid pressure vessel 1 according to FIG. 1.

The lateral surface of the cryogenic fluid pressure vessel 1 shown is formed essentially elliptical in cross section. The lateral surface can optionally also be formed circular, polygonal, or as a combination of the mentioned shapes in cross section. This includes, for example, geometrical shapes which alternately have straight and curved sections, such as an octagon having rounded corners or an oval having flattened sections.

In addition, the cryogenic fluid pressure vessel 1 is positioned in this exemplary embodiment in a central region 103 of the aircraft 100 with respect to a transverse axis of the aircraft 100. In particular, the geometrical and/or mass center of gravity of the cryogenic fluid pressure vessel 1 with respect to the transverse axis of the aircraft 100 corresponds to the mass center of gravity of the aircraft 100. The central region 103 preferably extends axially symmetrically along the transverse axis starting from the longitudinal axis of the aircraft 100, but can also extend asymmetrically starting from the longitudinal axis of the aircraft 100 along the transverse axis.

Furthermore, the aircraft 100 has an outer shell 101, which encloses the cryogenic fluid pressure vessel 1 in sections. In particular, the outer shell 101 encloses the cryogenic fluid pressure vessel 1 from the front, above, below, and on both sides viewed in the fight direction of the aircraft 100. The outer shell 101 and the fastening connecting piece 9 of the structural insert 8 of the cryogenic fluid pressure vessel 1 can be coupled by a fastening means.

In addition, material inlays 104 having aramids are arranged in sections on the outer shell 101 in the exemplary embodiment according to FIG. 2. Alternatively or additionally, the material inlays 104 can contain other materials and/or textiles, which are capable of protecting the cryogenic fluid pressure vessel 1 from perforation by foreign objects, for example, by objects which are swirled around/floating above the runway during takeoff or by projectiles in the event of a terroristic attack. The material inlays 104 having aramids are arranged in sections, in particular, in the central region 103 of the aircraft 100 with respect to the transverse axis of the aircraft 100. In this way, inner regions of the aircraft 100 and in particular the cryogenic fluid pressure vessel 1 are better protected in the event of bullets, bodies, or the like impacting the outer shell 101. In particular, para-aramid fibers have a high energy absorption capacity and are therefore typically used, inter alia, in armors for vehicles or in bulletproof vests. At the same time, aramids are very temperature resistant.

In FIG. 2, the aircraft 100 furthermore has a first and a second payload fuselage section 105A, 105B for accommodating freight and/or persons, which are enclosed by the outer shell 101. That is to say, the outer shell 101 encloses both the cryogenic fluid pressure vessel 1 and also the two payload fuselage sections 105A, 105B. The first and the second payload fuselage section 105A, 105B each contain, as shown, payload fuselage section walls which enclose the payload fuselage sections. Therefore, pressurized cabins for passengers can be created in the payload fuselage sections, for example, wherein the first and the second payload fuselage section 105A, 105B each have a pressurized cabin separate from the other payload fuselage section or a shared pressurized cabin. Alternatively or additionally, the first and/or the second payload fuselage section can provide at least two regions in which a different pressure level prevails. One of the two regions could thus be provided for cargo and have a lower pressure level in comparison to the pressurized cabin for passengers.

For example, the cryogenic fluid pressure vessel 1 is positioned at least in regions with respect to the transverse axis of the aircraft 100 between the first and the second payload fuselage section 105A, 105B. In particular, the first and the second payload fuselage section 105A, 105B have comparable dimensions, so that this arrangement assists an axially symmetrical weight distribution of the aircraft 100 with respect to its longitudinal axis.

In the illustrated exemplary embodiment of the aircraft 100, the outside 10 of the cryogenic fluid pressure vessel 1 corresponds, viewed in the vertical axis of the aircraft 100, on two opposing sections of the lateral surface of the cryogenic fluid pressure vessel 1 to the contour of the outer shell 101, so that the two opposing sections each have a double-walled structure. The bending and/or torsional stiffness of the aircraft 100 can thus be increased in that the outer shell 101 and the outside 10 of the cryogenic fluid pressure vessel 1 mutually support one another. In particular, the outside 10 of the cryogenic fluid pressure vessel 1 and the contour of the outer shell 101 support one another in the central region 103. This combination of two wall structures can increase the structural rigidity of the aircraft 100. If the cryogenic fluid pressure vessel 1 has a geometry similar to an ellipse in cross section, the wall thickness of the cryogenic fluid pressure vessel 1 and/or the outer shell 101 can be reduced, by which a weight reduction is caused. Alternatively or additionally, the cryogenic fluid pressure vessel 1 can moreover be coupled to the first and/or the second payload fuselage section 105A, 105B. The payload fuselage section wall can be connected by a fastening means installed thereon to the fastening connecting piece 9 of the structural insert 8. The bending and/or torsional rigidity of the aircraft 100 can thus be increased. The cryogenic fluid pressure vessel 1 is thus also used to reinforce the aircraft structure in the fuselage sections, while the structure of the wings of the aircraft 100 does not receive any reinforcement by the cryogenic fluid pressure vessel 1. A certain flexibility for optimum aerodynamics is thus provided to the wings. The transition between wingtip and fuselage section optionally contains reinforcing elements 106, such as spars, ribs, or the like.

Figure 3:
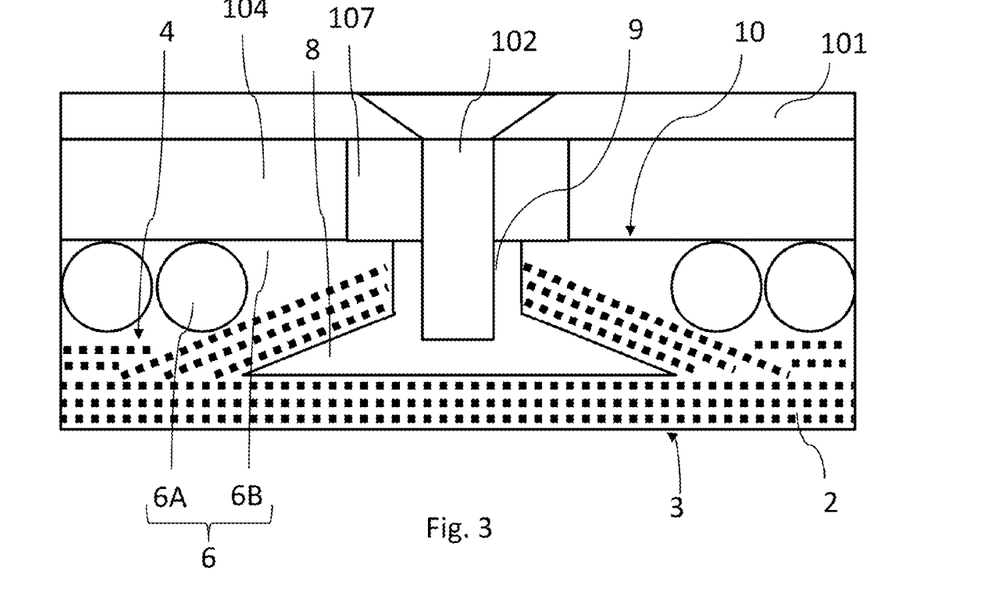
FIG. 3 shows a schematic detail view of a detail of the aircraft according to FIG. 2, wherein a mechanical coupling of the cryogenic fluid pressure vessel to an outer shell of the aircraft is illustrated as an example.

FIG. 3 shows a schematic detail view of a detail of the aircraft 100 according to FIG. 2, wherein a mechanical coupling of the cryogenic fluid pressure vessel 1 to an outer shell 101 of the aircraft 100 is illustrated by way of example.

According to this exemplary embodiment, the thermal barrier 6 has a cooling device 6A, which is designed as a pipeline system for conveying refrigerants. A refrigerant flowing through the pipeline system thus causes convective cooling of a cryogenic fluid accommodated in the cryogenic fluid pressure vessel 1. Refrigerants transport enthalpy, that is to say, thermal energy, from the cooled material to the surroundings. According to DIN EN 378-1 section 3.7.1, the refrigerant is defined as a "fluid, which is used for heat transfer in a refrigerating system, and which absorbs heat at low temperature and low pressure and emits heat at higher temperature and higher pressure, wherein typically state changes of the fluid take place." Suitable refrigerants are, for example, ammonia, carbon dioxide, hydrocarbons, or halogenated hydrocarbons. The pipeline system can be fluidically connected, for example, to a refrigerator (not shown). The pipeline system comprises by way of example stainless steel, aluminum, plastic, composite materials, or metal alloys. Pipes of the pipeline system can be aligned, for example, essentially radially around the lateral surface of the cryogenic fluid pressure vessel 1 in a spiral.

Alternatively or additionally, the thermal barrier 6 has an insulating device 6B, which is designed as a sandwich structure having a vacuum in a fluidically sealed sandwich core, having a foam core or having an inert gas filling in the fluidically sealed sandwich core for thermal insulation between a cryogenic fluid accommodated inside the cryogenic fluid pressure vessel 1 and the surroundings. A combination of cooling device 6A and insulating device 6B is shown by way of example in FIG. 3. The cooling device 6A is arranged inside the second wall layer 5 on the outer surface 4 of the first wall layer 2, while the insulating device 6B is arranged inside the second wall layer 5 on the outside 10. The sandwich structure contains, for example, a sandwich core as an intermediate space which has foam. The sandwich core is alternatively, for example, a cavity fluidically sealed by walls, which is filled with inert gas, for example argon or krypton, or contains a vacuum.

In the exemplary embodiment according to FIG. 3, the structural insert 8 is integrated, for example, in the first wall layer 2 in a formfitting manner by overlaps of the carbon fiber-reinforced plastic. The fastening connecting piece 9 has an internal thread here by way of example. Via a fastening means 102 in the form of a screw, the outer shell 101 and the cryogenic fluid pressure vessel 1 are mechanically coupled with one another. The screw can support itself by way of its screw head on the outer shell 101. In addition, a spacer 107 is provided here by way of example between the outer shell 101 and the fastening connecting piece 9. The spacer 107 encloses the fastening means 102 at least in sections and prevents the contact between the outer shell 101 and the fastening connecting piece 9. To damp vibration transmissions and/or absorb shocks, the spacer 107 can have, for example, plastics, laminate plates, foams, or combinations thereof.

Furthermore, the first wall layer 2 in FIG. 3 has a thicker wall layer thickness in the region in which it overlaps the structural insert 8 than in regions not provided with the structural insert 8.

Figure 4:
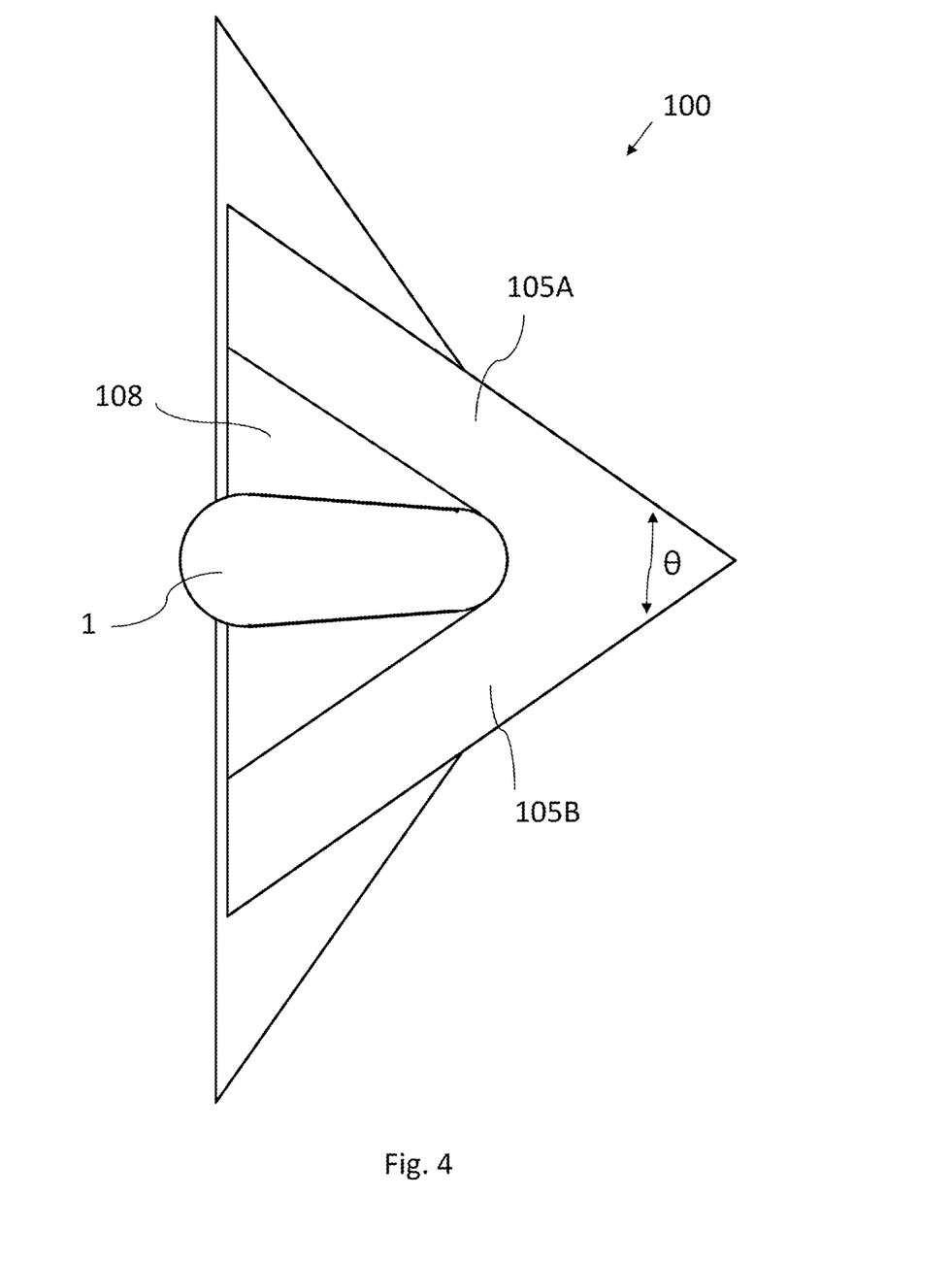
FIG. 4 shows a schematic top view of an aircraft having a cryogenic fluid pressure vessel according to a further exemplary embodiment of the invention.

FIG. 4 shows a schematic top view of an aircraft 100 having a cryogenic fluid pressure vessel 1 according to a further exemplary embodiment of the invention.

The aircraft 100 according to FIG. 4 is shown by way of example as an airplane. In particular, the aircraft 100 is shown as a so-called flying wing 100, which has a flowing transition between fuselage and wings. The flying wing has a larger fuselage volume at comparable structural size in comparison to conventional cylindrical airplane fuselages.

In this exemplary embodiment, the cryogenic fluid pressure vessel 1 can withstand a pressure of 350 to 750 bar of the cryogenic fluid to be accommodated therein. Alternatively or additionally, the lateral surface of the cryogenic fluid pressure vessel 1 is formed conical in longitudinal section. The cone widens against the flight direction here, for example, so that the installation space in the rear can be better utilized or the mass center of gravity of the flying wing is displaced further in the direction of the rear.

In addition, the first and the second payload fuselage section 105A, 105B each extend longitudinally and are aligned in their longitudinal extension at an angle θ to one another, the intersection point of which corresponds to the nose of the aircraft. The two payload fuselage sections 105A, 105B span a plane here which is parallel to the plane of the wings. The angle θ is provided in particular in such a way that the two payload fuselage sections 105A, 105B are aligned V-shaped, i.e., in an angle range of 10° to 85° to one another, in particular in an angle range of 25° to 70° to one another.

A space 108 between the payload fuselage sections 105A, 105B and the cryogenic fluid pressure vessel 1 can advantageously have electrical systems and/or drive systems. This space 108 can optionally furthermore contain freight or cargo. The space 108 can have the same or a lower pressure level in its interior here than the interior of the payload fuselage sections 105A, 105B.

Furthermore, the flying wing 100 can have windows at the front wing edge. Passengers who are located in the payload fuselage sections 105A, 105B can thus look out of the flying wing.

The aircraft 100 according to the exemplary embodiment in FIG. 4 also enables shorter conveying paths of the fluid from the cryogenic fluid pressure vessel to the drive system in the rear of the aircraft in comparison to airplanes having conventional fuselage-wing arrangement, in which the tanks are generally arranged in the wings. Weight can thus be saved by shortened conveying lines. Moreover, the temperature of the cryogenic fluid equalizes less to the ambient temperature during the conveyance through the conveying lines due to the shorter conveying path.

In the preceding detailed description, various features have been summarized in one or more examples to improve the stringency of the description. However, it is to be clear here that the above description is solely of an illustrative, but not of a restrictive nature. It serves to cover all alternatives, modifications, and equivalents of the various features and exemplary embodiments. Many other examples will be immediately and directly clear to a person skilled in the art on the basis of his technical knowledge in consideration of the above description.

The exemplary embodiments were selected and described to be able to represent the underlying principles of the invention and their possible applications in practice in the best possible manner Persons skilled in the art can thus optimally modify and use the invention and its various exemplary embodiments with respect to the intended purpose. In the claims and the description, the terms "including" and "having" are used as neutral terms for the corresponding term "comprising". Furthermore, a use of the terms "a", "an", and "one" is not in principle to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 cryogenic fluid pressure vessel
2 first wall layer
3 inner contact surface
4 outer surface
5 second wall layer
6 thermal barrier
6A cooling device
6B insulating device
7 inlet/outlet opening
8 structural insert
9 fastening connecting piece
10 outside
100 aircraft
101 outer shell
102 fastening means
103 central region
104 material inlays
105A first payload fuselage section
105B second payload fuselage section
106 reinforcing elements
107 spacer
108 space
θ angle

The invention claimed is:

1. A cryogenic fluid pressure vessel for an aircraft, comprising:
a first wall layer, which contains carbon fiber-reinforced plastic, having an inner contact surface for contact with a pressurized cryogenic fluid to be accommodated inside the cryogenic fluid pressure vessel;
a second wall layer, which is arranged on an outer surface of, and in contacting relationship with, the first wall layer and has a thermal barrier, wherein the thermal barrier includes an insulating device and a cooling device which is configured as a pipeline system comprising a plurality of pipes, such that both the cooling device and the insulating device are arranged inside the second wall layer, wherein the insulating device is interspersed between the plurality of pipes;

a closable inlet/outlet opening for cryogenic fluid, which extends through the first and the second wall layer; and a structural insert integrated in the first and the second wall layer, which has a fastening connecting piece located on the outside of the cryogenic fluid pressure vessel for mechanically coupling the cryogenic fluid pressure vessel with external structures;

wherein the cryogenic fluid pressure vessel forms an essentially cylindrical main body.

2. The cryogenic fluid pressure vessel as claimed in claim 1, wherein the pipeline system is configured for conveying refrigerants, so that a refrigerant flowing through the pipeline system causes convective cooling of a cryogenic fluid accommodated in the cryogenic fluid pressure vessel.

3. The cryogenic fluid pressure vessel as claimed in claim 2, wherein the plurality of pipes of the pipeline system are aligned radially around a lateral surface of the cryogenic fluid pressure vessel in a spiral.

4. The cryogenic fluid pressure vessel as claimed in claim 1, wherein the insulating device is configured as a sandwich structure having a vacuum in a fluidically sealed sandwich core, having a foam core, or having an inert gas filling in the fluidically sealed sandwich core for thermal insulation between a cryogenic fluid accommodated inside the cryogenic fluid pressure vessel and an area surrounding the cryogenic fluid pressure vessel.

5. The cryogenic fluid pressure vessel as claimed in claim 1, wherein the fastening connecting piece is arranged on a lateral surface of the essentially cylindrical cryogenic fluid pressure vessel.

6. The cryogenic fluid pressure vessel as claimed in claim 1, wherein the structural insert is integrated in a formfitting manner in the first wall layer by overlaps of the carbon fiber-reinforced plastic.

7. The cryogenic fluid pressure vessel as claimed in claim 6, wherein the first wall layer has a thicker wall layer thickness in a region in which it overlaps the structural insert than in regions not provided with the structural insert.

8. The cryogenic fluid pressure vessel as claimed in claim 1, wherein the cryogenic fluid pressure vessel is configured to withstand a pressure of 350 to 750 bar applied to a cryogenic fluid accommodated inside the cryogenic fluid pressure vessel.

9. The cryogenic fluid pressure vessel as claimed in claim 1, wherein a lateral surface of the cryogenic fluid pressure vessel is formed at least one of elliptical in cross section or conical in longitudinal section.

10. The cryogenic fluid pressure vessel as claimed in claim 1, wherein the fastening connecting piece of the structural insert has an internal thread, an eye, a bayonet fitting, or a material which can be welded or adhesively bonded on the outside.

11. An aircraft comprising:
a cryogenic fluid pressure vessel as claimed in claim 1; and
an outer shell, which encloses the cryogenic fluid pressure vessel in sections,
wherein the outer shell and the fastening connecting piece of the structural insert of the cryogenic fluid pressure vessel are coupled by a fastening means.

12. The aircraft as claimed in claim 11, wherein the cryogenic fluid pressure vessel is positioned in a central region of the aircraft with respect to a transverse axis of the aircraft.

13. The aircraft as claimed in claim 11, wherein material inlays having aramids to increase an energy absorption capacity are arranged in sections on the outer shell.

14. The aircraft as claimed in claim 13, wherein the material inlays are arranged in a central region of the aircraft with respect to a transverse axis of the aircraft.

15. The aircraft as claimed in claim 11, furthermore having a first and a second payload fuselage section for accommodating freight and/or persons, which are enclosed by the outer shell, wherein the cryogenic fluid pressure vessel is positioned at least in regions with respect to a transverse axis of the aircraft between the first and the second payload fuselage section.

16. The aircraft as claimed in claim 15, wherein the first and the second payload fuselage section each extend longitudinally and are aligned in their longitudinal extension at an angle to one another.

17. The aircraft as claimed in claim 16, wherein the first and second payload section are aligned in a V-shape, an intersection point of which corresponds to a nose of the aircraft.

18. The aircraft as claimed in claim 11, wherein the outside of the cryogenic fluid pressure vessel, viewed in a vertical axis of the aircraft, corresponds on two opposing sections of a lateral surface of the cryogenic fluid pressure vessel to a contour of the outer shell, so that the two opposing sections each have a double-walled structure.

* * * * *